F. Douglas,
Wood Molding Machine,
N° 78,728
Patented June 9, 1868.
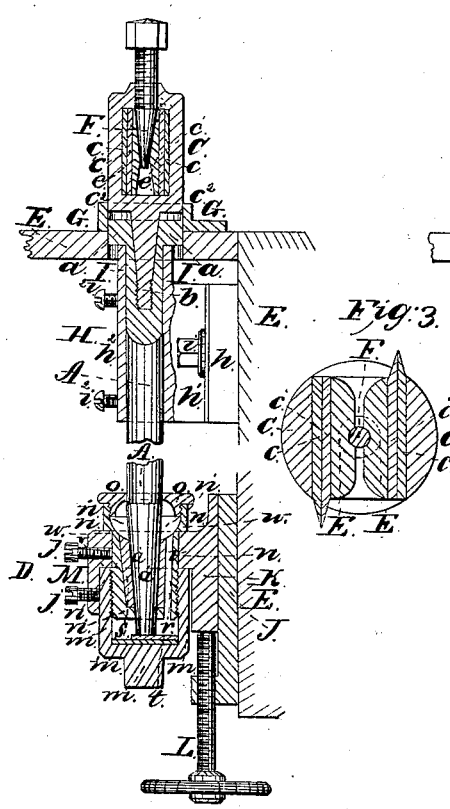
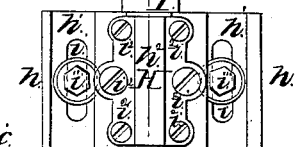
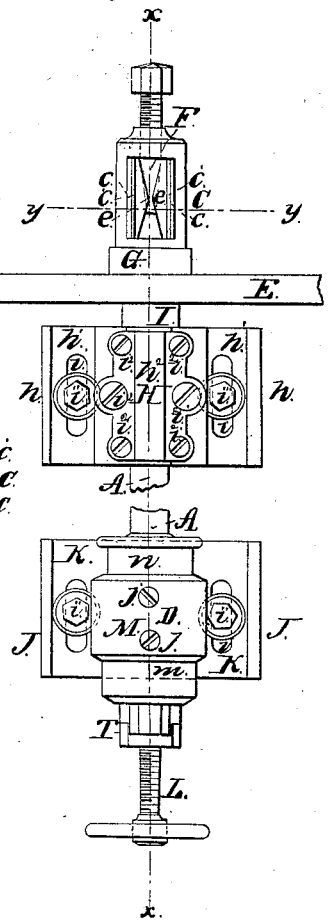
Witnesses:
Chas. A. Pettit
S. K. Ellsworth
Inventor:
Frank Douglas
By Munn & Co.
Attys.

UNITED STATES PATENT OFFICE.

FRANK DOUGLAS, OF NORWICH, CONNECTICUT.

IMPROVEMENT IN PLANING-MACHINES FOR WOOD.

Specification forming part of Letters Patent No. 78,728, dated June 9, 1868.

*To all whom it may concern:*

Be it known that I, FRANK DOUGLAS, of Norwich, in the county of New London and State of Connecticut, have invented a new and Improved Cutter-Head and Spindle for Machines for Planing, Rabbeting, Molding, &c.; and I do hereby declare that the following is a full, clear, and exact description of the construction and operation of the same, reference being had to the annexed drawings, making a part of this specification, in which—

Figure 1 is a vertical axial section through the line $x$ $x$ of Fig. 2. Fig. 2 is a side elevation. Fig. 3 is a cross-section of the cutter-head through the line $y$ $y$ of Fig. 2.

This invention comprises three important features—first, a new method of adjusting the cutters in the head, by which they can be held more firmly, and by which cap-cutters consisting of two single cutters can be employed; second, in a new form of spindle and a new method of attaching it to the shaft, by which it can be instantly adjusted with perfect accuracy, and so held for any length of time; and, third, in a new method of stepping the spindle-shaft, by which it can be easily adjusted and oiled, and by which its friction is greatly diminished.

In the drawings, A represents the spindle-shaft; B, the cutter-head spindle, and C the cutter-head itself, D being the journal-box, in which bears the lower end of the vertical shaft A, and E being a part of the table or frame of the machine. The cutter-head C is a cylindrical head, having an opening through it, in which the cutters are set, and stepped in the shaft A by means of a tapering spindle, B, provided with a cylindrical screw, $b$, at its bottom; and fitting into a tapering or conical socket in the upper end of the shaft $c$ $c^1$ are the cutter-blades. They may be arranged singly, or employed conjointly, as shown in Fig. 3, forming a double-cap cutter; or a solid-cap cutter may be used instead. By employing the two placed together, as shown in the drawing, one of the pair may be adjusted in or out farther than the other, thereby supporting the latter firmly in position, while enabling it to present but a single chisel-edge to the wood. In order to hold them firmly in the head I employ braces $e$ $e$, of the form shown in the drawings, each of them tapering from their center toward each end, as seen in Figs. 1 and 2, and also beveled off toward each side, as shown in Fig. 3. The side of these braces that bears against the cutters may be flat, or preferably a little concave, in order that the edges may set more firmly against the blades, and in order that if there should be any slight inequalities or unevenness in the back of the blades such inequalities will not interfere with the even and equable pressure of the braces against the blades all around their edges, so as to hold the latter firmly in place. The braces are held in place by a conical wedge or tapering bolt, F, which is screwed down through the top of the head C, and, entering between the braces $e$ $e$, forces them apart and against the cutters. Each brace has a conical groove along its back fitted to the wedge or plug F, so as to prevent the braces from turning or slipping, and at the same time distribute the pressure of the wedge along the whole central portion of the braces.

The shape of the braces is such as to give them great strength, and at the same time to properly distribute over their whole face the force applied at their back, enabling them to press against the cutters with great power and in an equal and uniform manner at all points.

Such being the construction and operation of the parts composing the cutter-head, it is adapted to the use of different kinds of cutters for all the different purposes that may be required of them, and it can be, in but a moment of time, inserted into the shaft by simply dropping its spindle B into the conical socket of the shaft and giving it a few turns to fix it in place.

I am aware that cylindrical spindles having screw-threads cut their entire length have been employed for this purpose before. Such spindles, however firmly they may be screwed into the shaft, will allow the cutter-head a slight vibration.

My invention, so far as it relates to the attaching of the cutter-head, or spindle on which the cutter-head is placed, to the shaft, consists solely of the combination of the conical spindle with the screw at its extremity operating in the socket, as set forth above.

The shaft A is formed with a broad cylindrical head, $a$, having a smooth horizontal upper surface, and working in an annular collar or guide, G, fixed to the upper surface of the table.

It has heretofore been the practice to employ the lower part of the cutter-head itself, (seen at $c^2$ $c^2$,) as a guide to the stick while molding or shaping irregular forms. The motion of the cutter-head, however, interferes with the steadiness with which the stick should be held, and I prefer to guide the latter by a fixed smooth collar.

When a vertical cutter-head is used in combination with a surfacing-planer, the guide-collar G is not employed, and the smooth head $a$ $a$ runs below the under surface of the board to be planed; and in case the board to be planed is not to be edged or grooved by the vertical head, said head can be easily removed by a few turns, and allow the board or plank to pass over spindle A.

The shaft being thus constructed, its upper end is supported in an adjustable bearing, H, composed of three pieces—viz., the first, a bed-plate, $h$, fastened firmly to the table or frame; the second, a half-box, $h^1$, resting on the bed-plate, and movable up and down on it by means of slots and set-screws $i$ $i^1$; and the third, a cap-plate or half-box, $h^2$, fitting over the shaft and screwed to the part $h^1$ by the bolts $i^2$ $i^2$. The upper ends of the parts $h^1$ $h^2$ are prolonged into a sort of collar, I, which surrounds the shaft, and projects up toward the cutter-head, as seen in Figs. 1 and 2, and upon the upper end of which the head $a$ will bear when the shaft is let down far enough. The lower end of the shaft rests in an adjustable journal-box, D. Of the apparatus composing this box, J is a bed-plate, and K a sliding plate, corresponding in function to the plates $h$ and $h^1$, respectively, of the upper journal-box, and the sliding plate being vertically adjustable in the same manner, besides having a gage-screw, L, beneath it, to assist in elevating it when necessary, and to keep it from jarring or working down. The plate K, instead of forming a half-box, like its corresponding part in the upper box, is provided with a stout ring, M, which holds the journal-box proper and the lubricating apparatus in position, they being clamped within it by means of set-screws $j$ $j$.

The journal-box proper consists of three parts—$m$, $n$, and $o$—the several parts being formed, screwed together, and supported in the ring M, as clearly represented in Figs. 1 and 2, and, when united, forming an oil-reservoir, $m'$, in the lower end, and another, $n'$, in the upper end of the apparatus, connected with each other by a small duct, $r$, extending down through the solid wall of the part $n$.

The lower bearing-portion, $a'$, of the shaft A is made tapering, and passes through a tapering bearing, $s$ $s$, of Babbitt metal within, and forming a part of the piece $n$, as seen in Fig. 1.

The lower end of the shaft rests on a loose plate, $t$, of the same metal, which itself rests upon the bottom of the oil-chamber $m'$, the latter being covered or lined with a steel plate.

The lubricating apparatus can be easily taken apart for any purpose that may require it. By unscrewing the cap $o$, the oil-cup is exposed and can be cleaned or replenished. By unscrewing the parts $n$ and $m$, each can be removed. When in position the apparatus is supported in the ring M by a shoulder, $w$, on the part $n$, which rests on the upper edge of the ring, and it is kept from being moved upward by the operation of the part $m$, the latter being made larger in diameter than the part $n$, which screws into it, and its upper end pressing up against a shoulder inside of the ring M, as seen at $v$ $v$, Fig. 1.

The operation of this self-oiling or adjustable step is as follows: When vertical spindle A is placed in its step, and its lower end rests on steel collar $t$, the cup $m$ is turned down on the part $n$ until the shaft A is adjusted to a nice fit in its taper bearing. When the bearing $s$ $s$ becomes worn, or the shaft is loose, the cap $m$ may be held in its place by set-screw $j$, and the part $n$ turned up until a nice fit is made; or the part $n$ may be held in its position by screw $j$, and cup $m$ turned down, as before mentioned. The parts $m$ and $n$ may be made to slip one into the other without screw-threads, and held in their places by set-screws. Cap O is removed, when the spaces $m$ and $n$ are filled with oil, which must remain in its place around the entire length of the bearing, as there is no chance for it to escape.

Having thus described my invention, I do not claim, broadly, the use of braces of every form to confine the cutters in the head, for I am aware that flat braces of uniform thickness from end to end have been used by L. D. Towne and others; neither do I claim confining the cutter-head to its shaft by means of a tapering spindle, having a screw on its lower end to receive a nut, as in the invention patented by said Towne, February 12, 1856; but

What I do claim as my invention, and desire to secure by Letters Patent, is as follows, viz:

1. The braces $e$ $e$, when constructed in the double-inclined form and used in connection with the plug or wedge F, in the manner and for the purposes specified.

2. The fixed guide G, when employed in connection with the cutter-head C and the table E, substantially as and for the purpose set forth.

3. The combination of the tapering spindle B, having a cylindrical screw on its lower end, with the tapering socket, having its lower end cylindriform and cut into a female screw to receive the screw on the lower end of the spindle, when said parts are constructed to operate in the manner described, and employed for the purpose of attaching a cutter-head to its shaft.

4. The combination of the taper bearing-box *n* with the oil-cup *m*, when made so as to slide one onto the other, to adjust shaft A to its proper bearing, and to compensate for the wear of said parts, in the manner specified.

FRANK DOUGLAS.

Witnesses:
ALBERT S. BOLLES,
ALLEN TENNY.